United States Patent
Kirjavainen

(10) Patent No.: US 6,767,501 B1
(45) Date of Patent: Jul. 27, 2004

(54) METHOD AND APPARATUS FOR MAKING PLASTIC FILM, AND PLASTIC FILM

(75) Inventor: Kari Kirjavainen, Tampere (FI)

(73) Assignee: Conenor Oy, Espoo (FI)

( * ) Notice: Subject to any disclaimer, the term of this patent is extended or adjusted under 35 U.S.C. 154(b) by 0 days.

(21) Appl. No.: 09/647,739

(22) PCT Filed: Apr. 1, 1999

(86) PCT No.: PCT/FI99/00277

§ 371 (c)(1),
(2), (4) Date: Oct. 4, 2000

(87) PCT Pub. No.: WO99/51419

PCT Pub. Date: Oct. 14, 1999

(30) Foreign Application Priority Data

Apr. 7, 1998 (FI) .................................................. 980800

(51) Int. Cl.[7] .......................... B29C 49/02; B29C 49/08; B29C 55/14

(52) U.S. Cl. ................ 264/572; 264/288.4; 264/288.8; 264/290.2; 425/325; 425/326.1; 425/387.1; 425/404

(58) Field of Search ............................. 264/290.2, 572, 264/50, 288.4, 288.8; 425/387.1, 325, 326.1, 404

(56) References Cited

U.S. PATENT DOCUMENTS

| | | | |
|---|---|---|---|
| 3,244,781 A | | 4/1966 | Covington, Jr. et al. |
| 3,634,564 A | | 1/1972 | Okamoto et al. |
| 3,891,374 A | | 6/1975 | Ninomiya et al. |
| 4,814,124 A | | 3/1989 | Aoyama et al. |
| 4,909,971 A | * | 3/1990 | Coughlin et al. ........... 264/45.5 |
| 4,978,484 A | * | 12/1990 | Takashige et al. ......... 264/40.1 |
| 5,188,777 A | | 2/1993 | Joesten et al. |
| 5,695,868 A | * | 12/1997 | McCormack ............... 428/283 |

FOREIGN PATENT DOCUMENTS

| | | | |
|---|---|---|---|
| DE | 3513526 A1 | | 10/1986 |
| EP | 0182764 B1 | | 5/1986 |
| EP | 0672516 A3 | | 9/1995 |
| GB | 1384556 | | 2/1975 |
| GB | 2 143 772 | * | 2/1985 |
| WO | WO 9533618 | | 12/1995 |

* cited by examiner

*Primary Examiner*—Allan R. Kuhns
(74) *Attorney, Agent, or Firm*—Young & Thompson

(57) ABSTRACT

A film is extruded from plastic material by an extruder. The film is orientated after extrusion. Material is mixed into the plastic so that when the plastic film is stretched, cavitation bubbles are formed in the material particles mixed into the plastic. During the orientation, gas is arranged to the plastic film under high pressure so that the gas diffuses in the cavitation bubbles and causes overpressure in them. Thus, it is possible to make a thin foamed film with a foaming degree over 70%.

22 Claims, 4 Drawing Sheets

METHOD AND APPARATUS FOR MAKING PLASTIC FILM, AND PLASTIC FILM

BACKGROUND OF THE INVENTION

The invention relates to a method for making a plastic film, the method comprising extruding a plastic film and orientating it.

The invention also relates to an apparatus for making a plastic film, the apparatus comprising an extruder and at least one orientation device for orientating the extruded film.

The invention further relates to a plastic film which comprises bubbles with the maximum diameter of about 100 micrometers and the maximum height of about 10 micrometers.

DESCRIPTION OF THE RELATED ART

Making a plastic film by extruding it and then orientating it is known e.g. from U.S. Pat. Nos. 3,244,781 and 3,891,374. It is, however, difficult to make thin and in particular thin foamed films using these solutions.

EP publication 0,182,764 discloses a thin polypropylene film which contains wide and flat disk-like bubbles, which are about 80 micrometers in length and about 50 micrometers in width. The film is produced by extruding material which has been foamed chemically or by means of gas and by orientating the extruded material biaxially. The result is a very versatile plastic film. However, the foaming degree of the film is less than 50%, which is why the properties of the film are not good enough for all purposes.

Furthermore, it is not possible to produce thin films of polymethylpentene or cyclic olefin copolymer using the prior art solutions.

SUMMARY OF THE INVENTION

The object of this invention is to provide a very good and thin foamed plastic film and a simple and reliable method and apparatus for making said plastic film.

The method of the invention is characterized in that before extrusion material is mixed into the plastic of the plastic film, cavitation bubbles are formed in the plastic film to be stretched due to the influence of the material, after extrusion the plastic film is orientated by stretching, and simultaneously with orientation pressurized gas is arranged to act on the plastic film so that the gas diffuses in the cavitation bubbles, and thus bubbles containing gas are formed in the plastic film.

The apparatus of the invention is characterized in that the apparatus comprises gas supply means arranged in one orientation device for feeding pressurized gas into the plastic film simultaneously with orientation by stretching so that the fed gas diffuses in the cavitation bubbles that are formed in the plastic film during stretching, and thus bubbles containing gas are formed in the plastic film.

The plastic film of the invention is characterized in that material is mixed into the plastic of the plastic film, cavitation bubbles are formed in the plastic film to be stretched due to the influence of the material, and the plastic film is subjected to stretching and to pressure of pressurized gas simultaneously with stretching so that the bubbles contain said gas, the foaming degree of the plastic film being over 70%.

The basic idea of the invention is that a film is extruded from plastic material by means of an extruder and material has been mixed into the plastic so that when the plastic is stretched, cavitation bubbles are formed in the material particles mixed into the plastic. The film is orientated by stretching and at the same time gas is fed into the film under high pressure so that the gas diffuses in the cavitation bubbles and causes overpressure in them. The idea of a preferred embodiment is that after the first orientation the plastic film is orientated by stretching it in the direction substantially perpendicular to the first orientation direction, and thus the overpressure is released in the cavitation bubbles and the bubbles expand.

An advantage of the invention is that very thin films with a foaming degree of about 70 to 90% can be provided in a relatively simple manner. An advantage of the high foaming degree is that the electric and mechanical properties of the film are very good. A further advantage is that the method and apparatus can be used for making a film for example of polymethylpentene or cyclic olefin copolymer.

BRIEF DESCRIPTION OF THE DRAWINGS

The invention will be described in greater detail in the following drawings, in which.

DESCRIPTION OF THE PREFERRED EMBODIMENTS

Figure 1:
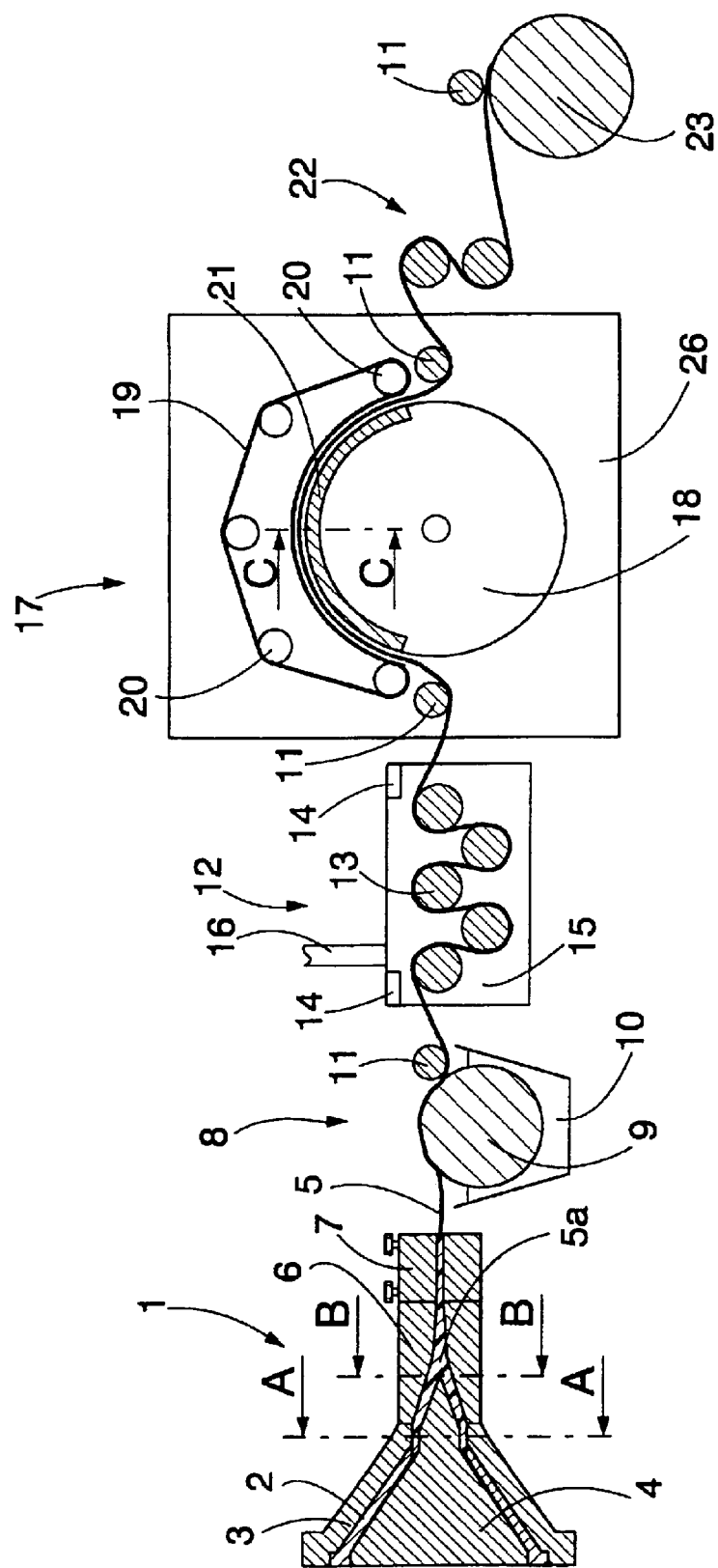
FIG. 1 is a schematic cross-sectional side view of an apparatus of the invention.

FIG. 1 is a side view of an apparatus according to the invention. The apparatus comprises an extruder 1. The extruder may be for example conical, i.e. it comprises a cone-shaped rotor 2, outside of which there is an outer stator 3 whose surface at least on the rotor 2 side is cone-shaped, and inside the rotor there is an inner stator 4 whose surface at least on the rotor 2 side is cone-shaped. When the rotor 2 rotates, it extrudes material which is between the rotor 2 and the stators 3 and 4 from the extruder 1 in a manner known per se. For the sake of clarity the figures do not illustrate e.g. the rotating means of the rotor or the feeding devices for feeding the material to be extruded into the extruder 1. The extruder 1 may comprise more than one rotor 2 and more than two stators 3 and 4. In that case the extruder 1 can be used for extruding multilayer products. The solution with one rotor 2 and two stators 3 and 4 can be used for making two-layer products. The end portion of the inner stator 4 is wide and tapers in the vertical direction so that together with the nozzle 6 it forms a relatively flat and wide gap through which the plastic 5a is extruded. After the nozzle 6 there is a calibration piece 7 whose nuts are used for adjusting the height of the gap, which allows to define the thickness of the plastic film 5 to be obtained from the extruder 1.

After the extruder 1 the plastic film 5 is cooled by a cooling device 8. The cooling device 8 may comprise e.g. a cooling roll 9, which is arranged in a cooling tank 10 containing a cooling medium, e.g. water. The plastic film 5 is arranged to be pressed against the cooling roll 9. The apparatus according to FIG. 1 uses auxiliary roils 11 for guiding the plastic film 5 at several points.

After cooling the plastic film 5 is guided to a machine direction orientation device 12. The machine direction orientation device 12 comprises orientation rolls 13 whose velocities are adjusted so that they can be used for stretching the plastic film 5 and thus for orientation in the machine direction. If desired, the velocity of each orientation roll 13 can be adjusted separately. The machine direction orientation device 12 may also comprise heating means 14, such as radiation heaters, for heating the plastic film 5 in a manner known per se. The orientation rolls 13 can also be used for heating the plastic film by supplying a heating medium, such as heated oil, to the orientation rolls 13 so that the orientation rolls 13 become warm. If desired, the temperature of each orientation roll 13 can be adjusted separately.

The orientation rolls are arranged in a discharge chamber 15. Pressurized gas, preferably air, is fed into the discharge chamber 15 along a gas supply pipe 16. Instead of air, nitrogen or another gas or gas mixture, for instance, may be used as the gas to be fed. The gas to be fed may also be selected according to the desired electric properties. For example, in respect of the dielectric strength of the product it would be advisable to use sulphurhexafluoride $SF_6$ and in respect of chargeability e.g. argon. The pressure of the gas to be fed is relatively small compared to the typical foaming methods, being preferably about 10 bars, but it may vary between 3 and 20 bars, for instance. Suitable material, such as calcium carbonate particles, is mixed into the plastic 5a of the plastic film 5, and due to the influence of the particles the joint surfaces of the plastic molecules and the mixed material are torn during orientation, and thus cavitation bubbles are formed. When orientation is performed by arranging pressurized gas to act on the plastic film 5, the gas in question diffuses in the cavitation bubbles and causes overpressure in the bubbles. In the discharge chamber 15 the pressurized gas can act on both sides of the plastic film 5, and thus gas bubbles are formed evenly in the plastic film 5. The discharge chamber 15 is sealed at the entry and exit of the plastic film 5 in a manner known per se.

Figure 2:
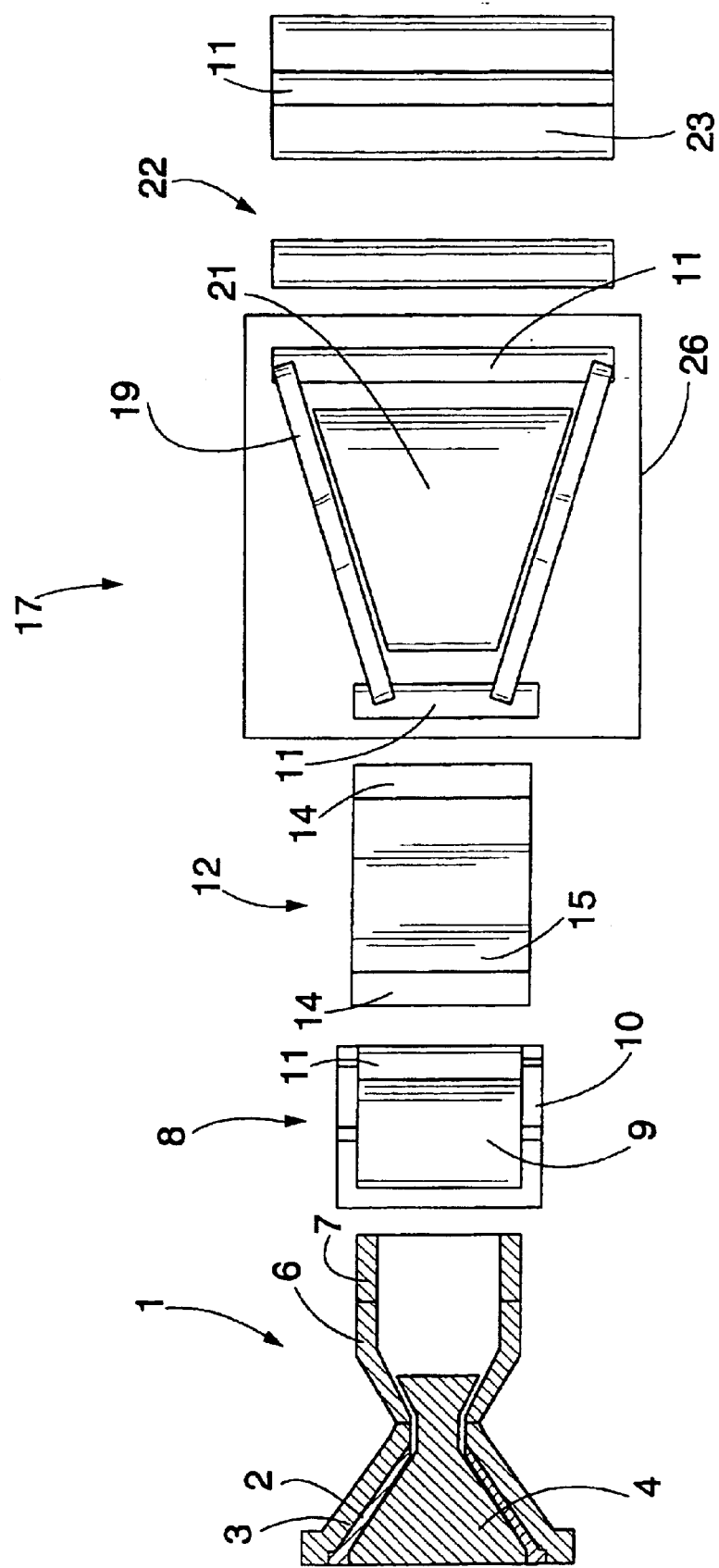
FIG. 2 is a partially cross-sectional top view of the apparatus illustrated in FIG. 1.

After the machine direction orientation device 12 the plastic film 5 is supplied to a cross-direction orientation device 17. In the cross-direction orientation device 17 the plastic film 5 is stretched in the cross-direction, i.e. orientation is performed in the direction substantially perpendicular to the direction of the orientation performed in the machine direction device 12. Due to the overpressure of the gas in the bubbles and cross-direction stretching the bubbles can grow sideways and also to some extent in the vertical direction in the cross-direction orientation device 17. In that case the foaming degree of the film is for example about 70 to 90%. The foaming degree can be adjusted simply by adjusting the pressure of the gas to be fed into the discharge chamber 15. The cross-direction orientation device 17 comprises two orientation wheels 18, and an orientation band 19 is arranged against both of the wheels. The orientation band 19 is an endless band which is guided by means of band guide rolls 20. The orientation band 19 presses the edges of the plastic film 5 firmly and evenly between the orientation wheel 18 and the orientation band 19 substantially along the whole travel the cross-direction orientation device 17, in which case the film is not subjected to varying pressure stress or tensile strain, and thus the plastic film stretches sideways without tearing. In FIG. 1 the plastic film 5, orientation wheel 18 and orientation band 19 are illustrated at a distance from one another for the sake of clarity, but in reality these parts are pressed firmly against one another. The orientation wheels 18 and the orientation bands 19 are arranged so that in the direction of the plastic film they are further away from one another at the end than at the beginning, as is illustrated in FIG. 2, and thus the cross-direction orientation device 17 stretches and simultaneously orientates the plastic film 5 in the cross-direction. The deviation of the angle between the orientation wheels 18 and the orientation bands 19 from the machine direction can be adjusted according to the desired degree of cross-direction stretching. One or more band guide rolls 20 can be arranged to be rotated by the rotating means. Since the bands 19 are firmly pressed against the orientation wheels 18, the orientation wheels 18 do not necessarily need rotating means but may rotate freely. For the sake of clarity the enclosed figures do not illustrate rotating means or other actuators of the apparatus. A curved support plate 21, which has substantially the same shape as the circumference of the orientation wheels 18, is arranged between the orientation wheels 18 to support the plastic film 5.

The cross-direction orientation device 17 can be placed in a casing 26 of its own. If desired, the casing 26 can be provided with heaters known per se, such as radiation heaters, to heat the plastic film 5.

After the cross-direction orientation device 17 the plastic film 5 is led to a relaxation unit 22. In the relaxation unit 22 the plastic film 5 is relaxed, and thus the plastic film shrinks a bit in a manner known per se. Finally, the plastic film 5 is wound on a reel 23.

FIG. 2 is a cross-sectional top view of the apparatus of the invention at the extruder 1. For the sake of clarity FIG. 2 does not illustrate the plastic film 5 or the support structures of the apparatus onto which the rolls, reels and plates of the apparatus are attached, for instance.

Figure 3:
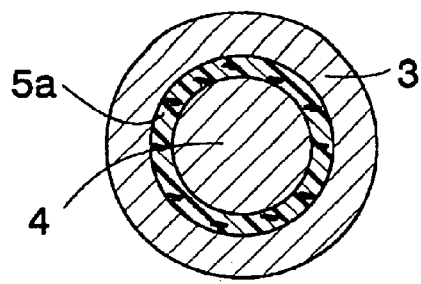
FIG. 3 is a cross-sectional view of a detail of the apparatus illustrated in FIG. 1 along line A—A.

FIG. 3 is a cross-sectional view of a detail of the extruder 1 along line A—A of FIG. 1. Here both the outer stator and the inner stator 4 are round in cross-section. Thus the plastic material 5a is also in an annular feeding channel.

Figure 4:
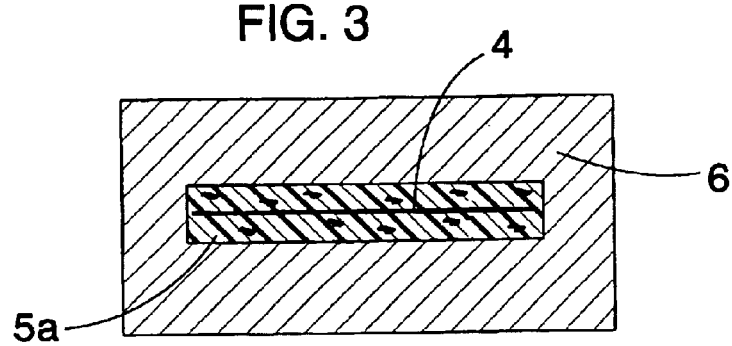
FIG. 4 is a cross-sectional view of a detail of the apparatus illustrated in FIG. 1 along line B—B.

FIG. 4 is a cross-sectional view of a detail of the extruder 1 along line B—B of FIG. 1. Here we see the wide tip of the inner stator 4 and the shape of the nozzle 6 which extrude the plastic 5a into the wide and flat gap, and thus a flat plastic film 5 is formed from the plastic 5a.

Figure 5:
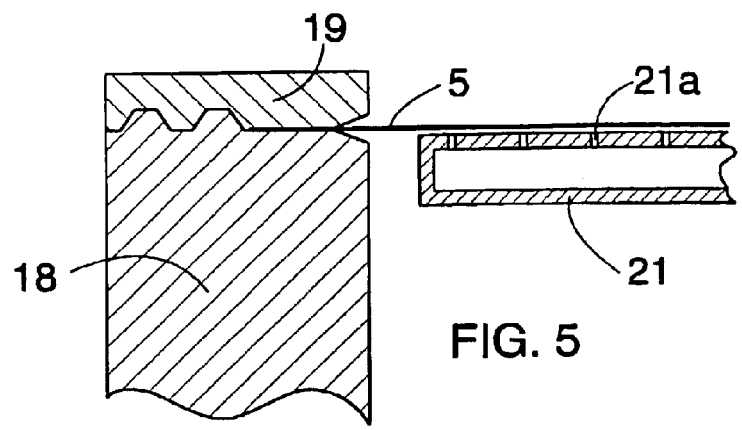
FIG. 5 is a cross-sectional view of a detail of the apparatus illustrated in FIG. 1 along line C—C.

FIG. 5 is a cross-sectional view of a detail of the cross direction orientation device 17 along line C—C of FIG. 1. It is seen in FIG. 5 how the orientation wheel and the orientation band are pushed against each other and press the plastic film 5 between each other. The surface of the support plate 21 against the plastic film 5 may be heated e.g. by providing it with heating resistors, and thus the plastic film 5 slides along the sliding surface in question very easily. Furthermore, propellant, such as air, can be blown from the support plate 21 through the gaps 21a, in which case the propellant flowing through the gaps 21a provides a sliding bearing between the support plate 21 and the plastic film 5.

The gas in question may be heated, if desired, and thus the sliding surface of the support plate 21 and the plastic film 5 are heated with the propellant flowing through the gaps 21a.

Figure 6:
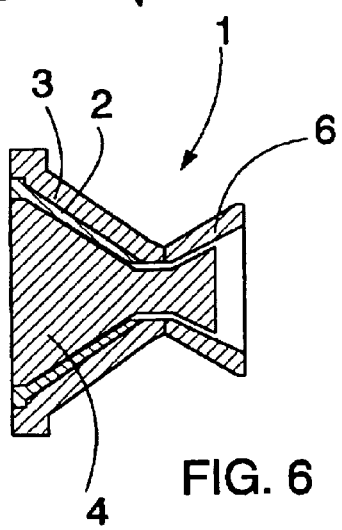
FIG. 6 is a schematic cross-sectional top view of an extruder used in the apparatus of the invention.

FIG. 6 illustrates an extruder 1 used in the apparatus according to the invention. The nozzle 6 of the extruder 1 widens up to the end portion of the extruder, i.e. up to the point where the plastic film 5 exits from the extruder 1. In the nozzle 6 of the extruder 1 the plastic 5a is thus all the time subjected to cross-direction orientation in addition to longitudinal orientation, which makes it considerably easier to orientate the plastic film in the cross-direction at a later processing stage.

Figure 7A:
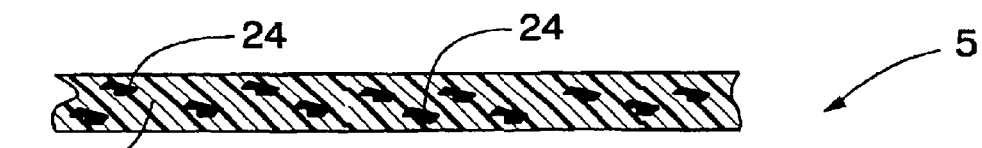
FIG. 7a is a cross-sectional side view of a plastic film extruded by the apparatus of the invention before orientation of the film.

FIG. 7a is a side view of the plastic film 5. Before extrusion calcium carbonate particles 24 have been mixed into the plastic 5a. Instead of calcium carbonate particles 24 some other material may also be mixed into the plastic 5a. The material should be such that it causes the joint surface of the plastic molecules and the material mixed into the plastic 5a to tear when the plastic film 5 is stretched so that cavitation bubbles are formed where the joint surfaces are torn. Thus some oily substance, such as silicone oil or paraffin oil, can be mixed into the plastic 5a. The particles mixed into the plastic 5a may cause spot-like asymmetry e.g. in the electric field in the plastic 5a, whereas the oily substance mixed into the plastic does not substantially worsen the electric properties of the plastic. It is also possible to mix a substance having a melting point lower than the orientation temperature of the plastic 5a, such as paraffin, into the plastic, in which case the substance melts when the plastic 5a is orientated. The plastic 5a may be made e.g. from polypropylene PP, polymethylpentene TPX or cyclic olefin copolymer COC. The heat resistance of polymethylpentene and cyclic olefin copolymer are better than that of polypropylene, for example. Electric charges also remain in polymethylpentene and cyclic olefin copolymer better than in polypropylene at high temperatures. Processing of polymethylpentene and cyclic olefin copolymer is very difficult but by the method and apparatus of the invention a very thin and foamed plastic film 5 can be made of them. In the situation illustrated in FIG. 7a the plastic film 5 has not been stretched yet.

Figure 7B:
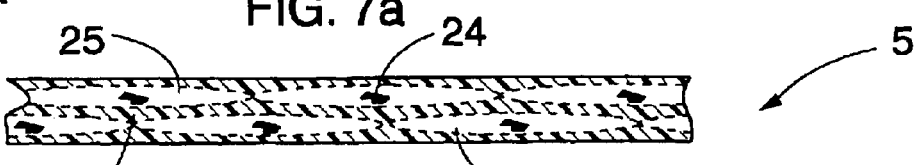
FIG. 7b is a cross-sectional side view of the plastic film extruded by the apparatus of the invention after longitudinal orientation.
Figure 7C:
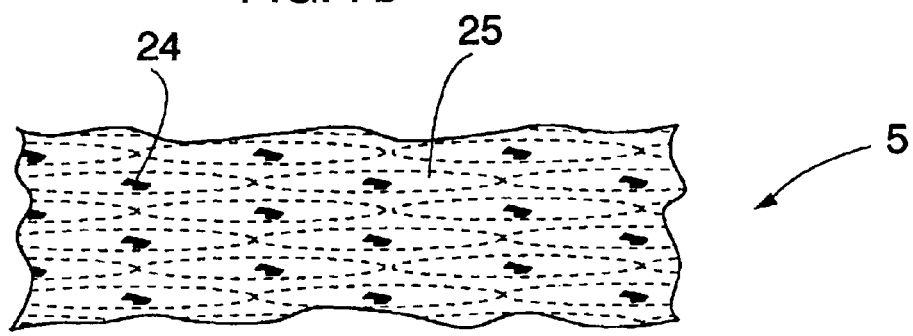
FIG. 7c is a schematic top view of the plastic film illustrated in FIG. 7b.

FIGS. 7b and 7c illustrate the plastic film 5 after it has been stretched in the machine direction orientation device 12, in which case the plastic film 5 has been simultaneously subjected to the pressure of the pressurized gas. In that case gas has diffused in the cavitation bubbles and caused overpressure in them, as a result of which bubbles 25 containing gas have formed. In the situation illustrated in FIGS. 7b and 7c the plastic film 5 has been subjected only to machine direction stretching, and consequently the bubbles 25 are long, flat and narrow.

Figure 7D:
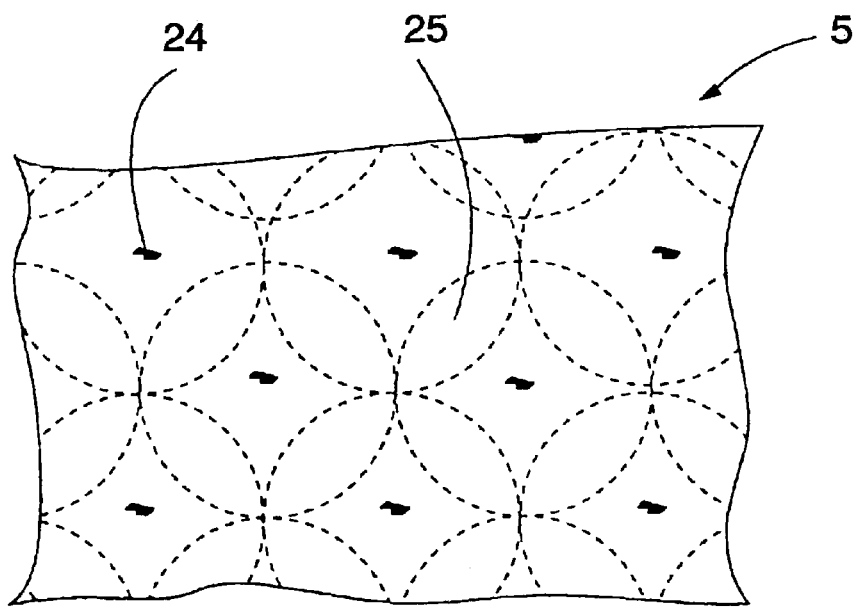
FIG. 7d is a schematic top view of the plastic film made by the apparatus of the invention after longitudinal and cross-direction orientations.

FIG. 7d illustrates a situation in which the plastic film 5 has also been stretched in the cross-direction by means of the cross-direction orientation device 17. The gas that was overpressurized in the bubbles 25 in the situation illustrated in FIGS. 7b and 7c has released in the lateral direction in the cross-direction orientation device 17. Thus the bubbles 25 are now also wide. In addition, the bubbles 25 are flat, i.e. they are plate-shaped or disk-like. The bubbles 25 are relatively small, their diameter is at most about 100 micrometers and their height is typically less than one micrometer, at most about 10 micrometers. However, the method and apparatus provide very thin plastic films 5. The thickness of the plastic films 5 may be only 10 micrometers.

The plastic film 5 can be used for several purposes in a manner known per se. At least one surface of the plastic film 5 can be provided with an electrically conductive coating, for instance, in which case the solution can be used e.g. as a microphone or loudspeaker in several acoustic applications, including sound attenuation. The plastic film 5 may also be permanently electrically charged.

The drawings and the related description are only intended to illustrate the inventive concept. The details of the invention may vary within the scope of the claims. Thus the orientation directions of the plastic film 5 and the order of orientations in different directions may vary. According to the invention, the simplest way to make a plastic film is to orientate the plastic film in the machine direction first and thereafter in the direction transverse to the machine direction.

What is claimed is:

1. A method for producing a plastic film with gas-containing bubbles, the method comprising the steps of:
   mixing a cavitation material into a plastic material to form an extrusion material;
   from the extrusion material, extruding a plastic film; orientating the plastic film by stretching such that cavitation bubbles are formed in the plastic film; and
   while orientating the plastic film by stretching, feeding a pressurized gas into the plastic film so that the gas diffuses into the cavitation bubbles and expands the bubbles, and thus expanded bubbles containing the gas are formed in the plastic film.

2. A method according to claim 1, wherein said orientating by stretching step, provides a first orientation in a first direction, and thereafter, the plastic film is subjected to a second orientation which is substantially perpendicular to the first orientation so that the bubbles containing gas expand due to the influence of the second orientation and the gas.

3. A method according to claim 2, wherein at the first orientation the plastic film is orientated in a machine direction and at the second orientation the plastic film is orientated in a direction substantially transverse to the machine direction.

4. A method according to claim 1, wherein a pressure of the gas acting on the plastic film is over 3 bars.

5. A method according to claim 1, wherein before extrusion, an oily substance or a substance having a melting point lower than an orientation temperature of the plastic material is mixed into the plastic material.

6. An apparatus for making a plastic film, the apparatus comprising an extruder, at least one orientation device for orientating the extruded film, and a gas supply means arranged in at least one orientation device for feeding pressurized gas into the plastic film simultaneously with orientation by stretching so that the fed gas diffuses in the cavitation bubbles that are formed in the plastic film during stretching, and thus expanded bubbles containing the fed gas are formed in the plastic film.

7. An apparatus according to claim 6, wherein the gas supply means are arranged in the first orientation device and wherein the apparatus comprises a second orientation device after the first orientation device in the direction of the plastic film, the second orientation device being arranged to orientate the plastic film in the direction substantially transverse to the orientation direction of the first orientation device so that the bubbles containing gas expand due to the influence of the second orientation device and the gas.

8. An apparatus according to claim 7, wherein the first orientation device is arranged to orientate the plastic film in the machine direction and the second orientation device is arranged to orientate the plastic film in the direction substantially transverse to the machine direction.

9. An apparatus according to claim 6, wherein the gas supply means comprise a discharge chamber in which case at least one orientation device is arranged inside the discharge chamber so that the pressure of the gas in the discharge chamber acts on both sides of the plastic film simultaneously with the orientation effect of the orientation device.

10. An apparatus according to claim 6, wherein the extruder comprises a nozzle which is arranged to widen up to the end portion of the extruder.

11. An apparatus according to claim 6, wherein the apparatus comprises a cross-direction orientation device, which comprises two orientation wheels and endless orientation bands which are arranged against the wheels and move around band guide rolls, both edges of the plastic film to be orientated being arranged between the orientation wheel and the orientation band and the orientation wheels and the orientation bands being arranged so that in the direction of the plastic film they are further away from one another at the end than at the beginning, in which case the cross-direction orientation device stretches the plastic film in the cross-direction.

12. An apparatus according to claim 11, wherein the apparatus comprises a curved support plate, which is arranged between the orientation wheels to support the plastic film.

13. An apparatus according to claim 12, wherein the support plate is provided with gaps and heated gas is arranged to flow through the gaps to heat the sliding surface of the support plate and plastic film.

14. An apparatus according to claim 6, wherein the gas supply means comprises a discharge chamber.

15. An apparatus according to claim 14, wherein the pressure of the gas in the discharge chamber acts on both sides of the plastic film.

16. A method for producing a plastic film with gas-containing bubbles, the method comprising the steps of:

mixing a cavitation material into a plastic material to form an extrusion material;

from the extrusion material, extruding a plastic film;

orientating the plastic film by stretching for forming bubbles in the plastic film; and during a first orientation stage of orientating the plastic film by stretching, feeding a pressurized first gas into the plastic film to introduce the first gas into the bubbles so that the bubbles contain the first gas.

17. The method of claim 16, wherein the material is selected so that the cavitation material tears joint surfaces of molecules of the plastic film.

18. The method of claim 16, wherein the cavitation material is calcium carbonate particles.

19. The method of claim 16, wherein the first gas is sulphurhexafluoride.

20. The method of claim 16, wherein the first gas is air.

21. The method of claim 16, wherein the gas is nitrogen.

22. The method of claim 16, wherein a pressure of the first gas is between 3 and 20 bars.

* * * * *